United States Patent [19]
Shelef et al.

[11] Patent Number: 5,240,023
[45] Date of Patent: Aug. 31, 1993

[54] SAFETY HOSE COUPLER

[76] Inventors: Gad Shelef, 777 San Antonio Rd., #97, Palo Alto, Calif. 94303; Peter M. Davidson, P.O. Box 3731, Stanford, Calif. 94309

[21] Appl. No.: 896,114

[22] Filed: Jun. 9, 1992

Related U.S. Application Data

[63] Continuation-in-part of Ser. No. 681,990, Apr. 8, 1991, abandoned.

[51] Int. Cl.⁵ .................. F16L 55/18; F16L 37/28
[52] U.S. Cl. ................................. 137/15; 251/149.6; 285/316
[58] Field of Search ............... 137/614.04, 15; 251/149.6; 285/316

[56] References Cited

U.S. PATENT DOCUMENTS

| | | | |
|---|---|---|---|
| 2,255,333 | 9/1941 | Scheiwer | 251/149.6 |
| 4,863,201 | 9/1989 | Cartsen | 251/149.6 |

FOREIGN PATENT DOCUMENTS

| | | | |
|---|---|---|---|
| 209648 | 11/1959 | Austria | 251/149.6 |
| 1291752 | 5/1970 | United Kingdom | 251/149.6 |

*Primary Examiner*—A. Michael Chambers
*Attorney, Agent, or Firm*—Limbach & Limbach

[57] ABSTRACT

A safety hose coupling and method are disclosed for a coupling assembly made up of a hollow male member and a hollow female member with a valve mounted therewithin and a lock actuation means movable first in one direction from a neutral position so that the male and female members can be assembled in a first locking position and locked in such position when the locking means is returned to neutral position. Then the locking means is moved in a direction opposite to the one direction and the male and female members moved further together to a second locking position and to open the valve whereby the locking means is then returned to neutral position to lock the male and female members together with the valve in open position.

23 Claims, 12 Drawing Sheets

SAFETY HOSE COUPLER

CROSS REFERENCE TO RELATED APPLICATION

This application is a continuation-in-part application of Ser. No. 681,990 filed Apr. 8, 1991, now abandoned, with the same title and now abandoned.

TECHNICAL FIELD

The present invention relates to improvements in quick connect coupling devices for removably joining pipes.

BACKGROUND OF THE INVENTION

The prior art is replete with improvements to the safe handling of quick release type pneumatic couplings. They consist of a socket member or female member and a nipple or male member. The female has a spring-loaded valve normally seated in the off position which is unseated to the on position by the nipple when connected. As has been pointed out elsewhere in the prior art, couplings of conventional type such as, by way of example, those derived from the MIL Spec 4109F, suffer from safety hazards when connecting and disconnecting the coupler. Since the nipple and socket members being joined are energized by the pressurized medium being transported, it is a dangerous possibility that these members may separate in an uncontrolled and radical manner during connection or disconnection. Improvements in this art provide various locking means and pressure release means to present such explosive separation.

U.S. Pat. No. 4,366,945 to A. Blauenstein discloses a hose coupling with double lock wherein a pair of cylindrical pins provide one lock and ball-shaped locking elements provide another lock with release effected by a sliding movement of a sleeve in one direction which is arrested in its extended position by a spring loaded latch element and subsequent return in the opposite direction to the original position of the sleeve. This construction is very complex and requires many elements constructed in a complex manner.

Netherlands Patent 109393 dated Sep. 15, 1964 discloses pairs of ball bearings which appear to be operated to successive unlocking positions by shifting a sleeve in one direction and returning it to its original position.

Other pertinent art includes U.S. Pat. Nos. 2,722,399, 2,795,438, 2,905,485, 3,574,359, 3,826,523, 3,858,910, 4,060,219, 4,253,683, 4,350,321, 4,366,945, 4,413,846, 4,483,510, 4,546,956 and 4,552,333, Netherlands Patent 109393 and German Patent 2,304,796, and German published application 2,304,795, dated Aug. 8, 1974.

BRIEF SUMMARY OF THE INVENTION

Applicants have invented a safety hose coupling much simplified in construction, manufacture and operation from the devices of the prior art.

Broadly stated, the present invention, to be described in greater detail below, is directed to a safety hose coupling made up of a male member with an annular rib on an insertion surface and a female member having a valve in bore therethrough but receiving the male member insertion surface and including at least a pair of locking means located on the female member for passing the annular rib between three position. The male and female members are sequentially passed in between a first uncoupled position, a second position coupled against longitudinal movement with the valve closed and a third position coupled against longitudinal movement with the valve open. The assembly including locking actuation means moveable in one direction from a neutral position in which both of the locking means are in locking position to a position wherein only one of the locking means is in unlocked position and from the neutral position in a direction opposite to said one direction wherein only the other of the locking means is in unlocked position.

In accordance with one aspect of the present invention, the assembly includes means for spring biasing the actuation means to the neutral position.

In accordance with another aspect of the present invention, each of the locking means includes a plurality of balls movably mounted in tapered holes in the female member between a locking position wherein the balls project into the female bore and engage the male member insertion surface to prevent movement of the rib surface therepast and an unlocked position wherein the balls are substantially withdrawn from the female bore and permit movement of the annular rib therepast.

Various features and advantages of the present invention will become more apparent on a perusal of the following specification taken in conjunction with the accompanying drawings wherein similar characters are referenced to similar elements in each of the several views.

DESCRIPTION OF AN OPERATIVE EMBODIMENT

Figure 1:
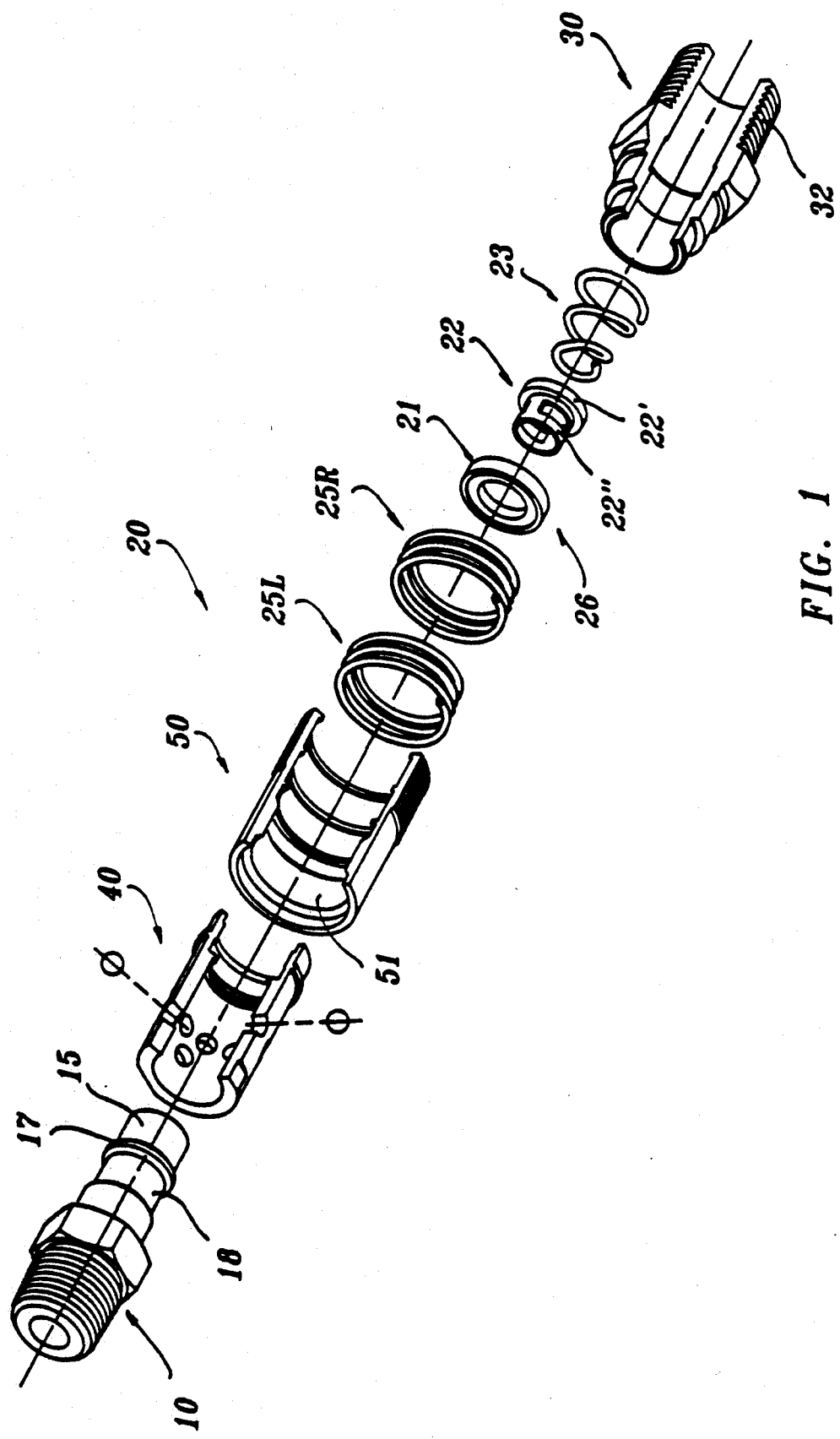
FIG. 1 is an exploded view of one assembly in accordance with the present invention.

As shown in the drawings, an operative embodiment of the present invention is shown in FIGS. 1-9 for an overall operative description of the present invention. After an explanation of FIG. 1-9, the preferred embodiment will be described with respect to FIG. 10-13.

Referring now to FIG. 1-9, the invention comprises two coupling members or assemblies, a male member or assembly 10 and a female member or assembly 20. The male member or assembly 10 is a unitary body as described in further detail below and the female member or assembly 20 comprises of a valve housing 30, a socket body 40, and a sleeve or locking actuation means 50 along with an annular valve seal 21, a valve plug 22, a plug spring 23, right and left ball shaped locking means 24R and 24L respectively and right and left sleeve springs 25R and 25L, respectively.

Figure 2:
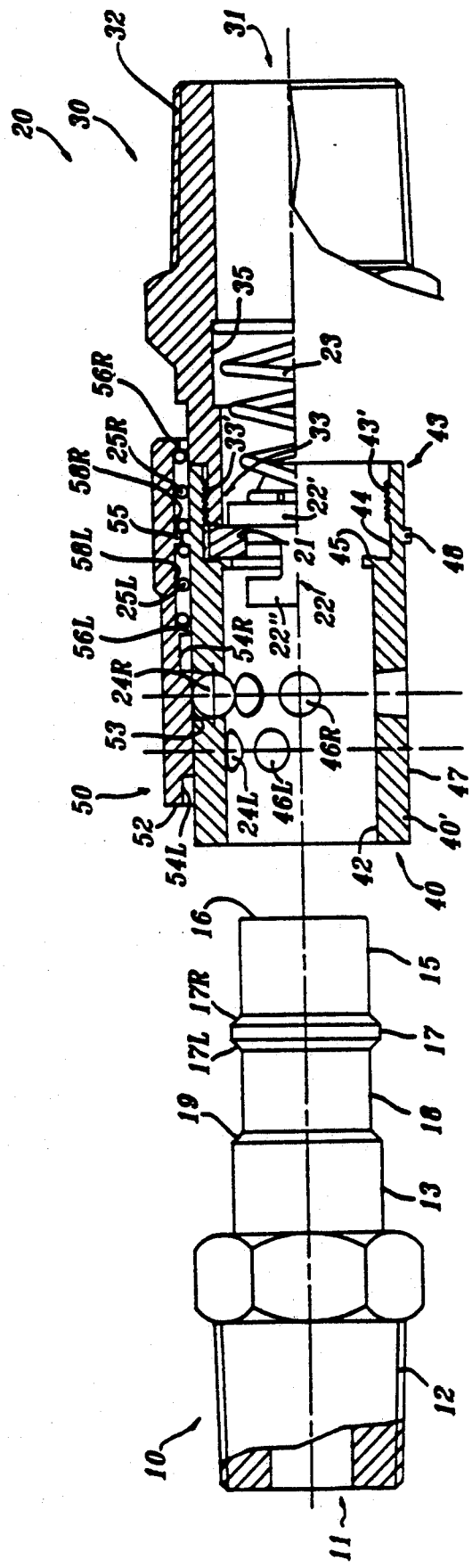
FIG. 2 is an elevational partial sectional view through the female and male members of the present invention in their uncoupled position.

The male member 10 conforms to the general description of those nipples found among conventionally known pipe couplings. With particular reference to FIG. 2, the male member body 10 has a longitudinal axial bore 11 therethrough which serves as a conduit for the fluid flow and on its left end a pipe, hose or device connection 12 such as threads. The intended flow is from right to left.

The male body 10 includes a cylindrical insertion surface 13 of a diameter to be received in the primary bore 42 of the socket body 40 of the female assembly 20. The male member 10 has a first reduced diameter cylindrical nose portion 15 extending from the radial lip 16 on the right end of the male member to an annular rib 17, and a second reduced diameter cylindrical portion forming a circumferential grove 18 to the left of the rib 17. Right and left rib bevels 17R and 17L are provided between the annular rib 17 and the reduced diameter portions 15 and 18, respectively.

Beginning from the right hand end of the female assembly 20, the valve housing 30 takes the form of a hollow cylindrical member having a primary bore 31 extending axially therethrough and with a pipe, hose or device connection 32 such as threads or connection to the source of high pressure fluid. The left hand end 33 of the valve housing 30 includes a socket body connection means 33' such as threads as shown in the Figures. The primary bore 31 is provided with an enlarged diameter portion 35 approximately midway along the length of the valve housing for supporting the end of the plug spring 23 described further below.

The socket body 40 is comprised of a cylindrical wall 40' and a primary bore 42 for slideably receiving the cylindrical insertion surface 13 of the male member 10. At its right hand end 43 the socket body 40 includes a valve housing connection, means 43' such as threads provided on a enlarged diameter bore 44 for receiving the end 33 of the valve housing 30. A radially inwardly directed projection or land 45 is provided between the primary bore 42 and the enlarged diameter bore 44 for clamping the annular seal 21 and for receiving the pressure applied to the annular seal 21 by the valve plug 22. The annular seal 21 is clamped between the land 45 and the end 33 of the valve housing 30.

The socket body cylindrical wall 40' is provided with two, spaced apart rows of tapered radial ball holes or bores 46R on the right and 46L on the left with locking balls 24R on the right and 24L on the left. The ball holes 46 are conically bored radially and are tapered such that the radially inward end is somewhat smaller in diameter than that of the balls and the radially outward end is somewhat larger than the diameter of the balls such that the balls 24 can be inserted in the ball holes 46 from the outside. The balls 24 may be constrained in the ball holes 46 at a point by a ball locking surface 53 which is the primary bore of the sleeve 50, described below and along a circle at the radially inward end of the ball holes. The thickness of socket body wall 40' and the diameter of the radially inward end of the ball holes 46 are such that when the balls 24 are so constrained a sufficient portion of each of the balls 24 protrudes inward radially in the socket body primary bore 42 to act as means for locking the male and female members 10 and 20 respectively in the various desired positions as shown in the different views. An annular, central, dual spring stop 48 projects radially outward on the outside surface of the socket body 40 to stop the right and left sleeve springs 25R and 25L as described below.

As particularly shown in FIG. 2, the sleeve or locking actuation means 50 includes a primary bore 53 for slideably mounting on the outside surface of the socket body wall 47. The primary bore 53 is provided from the left end 52 of the sleeve 50 with a left enlarged diameter ball recess surface 54L and then further to the right with a right enlarged diameter ball surface 54R, which enlarged surfaces 54L and 54R define therebetween a ball locking surface 53 which is at least as long and preferably slightly longer than the distance between the axes of the ball holes 46R and 46L. At the right hand end of the right enlarged diameter ball recess 54R a left spring stop 56L is provided with a radially inward surface substantially corresponding to the primary bore 53. Substantially half way between the left spring stop 56L and a right spring stop 56R at the right hand end of the sleeve 50 is a central spring stop 55. The radially inward surfaces of the central spring stop 55 and the right spring stop 56R are of a diameter to pass over the radially outwardly projecting central dual spring stop 48 of the socket body 40.

The left sleeve spring 25L is located in the left spring enlarged diameter portion 58L, and the right sleeve spring 25R is located in the right enlarged diameter portion 58R. The relationship of the wire diameter of the springs 25 and the height of the spring stops 48, 55 and 56R are such that the spring can not find its way under or over the stops.

Figure 7:
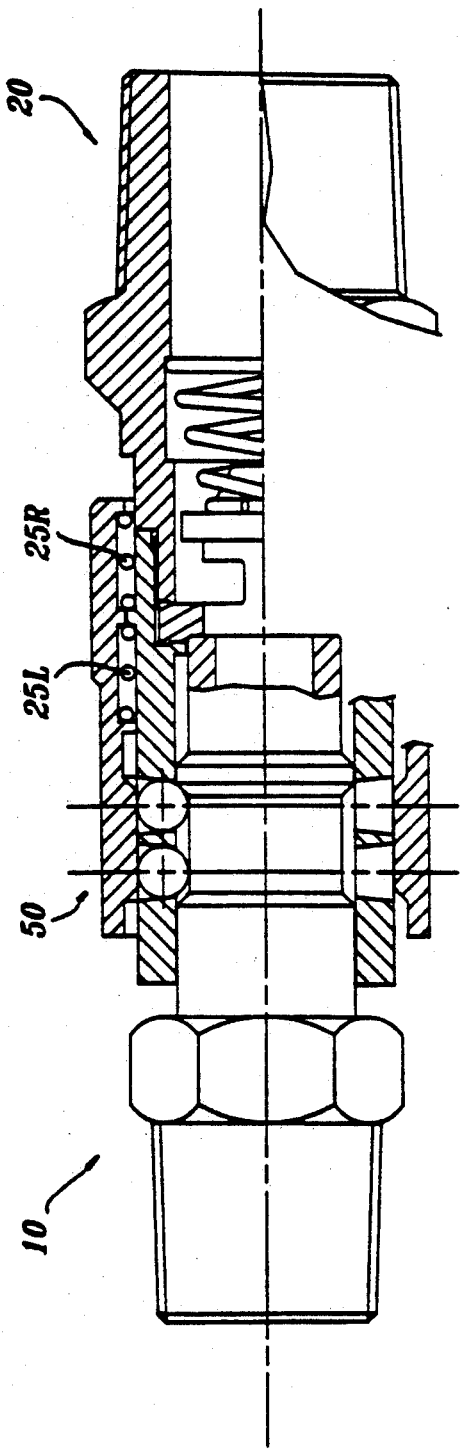

Valve 26 is comprised of valve plug 22, seal 21 and spring 23. Its function is to control fluid flow through the female bore 31. The valve plug 22 has an enlarged diameter portion 22' which in its normally closed position is forced up against the right hand or high pressure side of the annular seal 21 by the conical plug spring 23, the other end of which spring 23 is seated against the right hand end of the enlarged diameter bore 35 of the valve housing or held in place by means of a snap ring (not shown). The valve plug 22 is also held in position by the high pressure of the fluid on its right or source side. The valve plug 22 has a reduced diameter portion 22" which extends through the center of the annular seal 21 toward the left for engagement by the front radial lip 16 of the male member 10 for movement of the valve 26 from its normally-closed, spring loaded shutoff position shown in FIG. 2 to its open position as shown in FIG. 7 when the male 10 and female 20 members are fully coupled together for fluid passage longitudinally therebetween.

The functional relationship of the male 10 and female 20 members are particularly shown in FIGS. 2-7.

FIG. 2 shows the relationship of the female member 20 inner workings to the uncoupled male member 10. Valve spring 23 is in full extension tightly sealing the valve plug 22 against the seal 21. The valve 26 is closed and fluid cannot flow through the female bore 31 into the male bore 11. Right and left sleeve springs 25R and 25L hold sleeve 50 in neutral position with the sleeve central spring stop 55 substantially aligned with the socket body central spring stop 48 since the sleeve springs 25R and 25L are pressed against stop 48. The balls 24R and 24L are in locked position when the springs 25 are in neutral position. In this disconnected position, the male member 10 cannot enter the female member 20 sufficiently to unseat the valve plug 22 since its progress is blocked by the balls 24L pressing against the sleeve ball locking surface 53.

Figure 3:
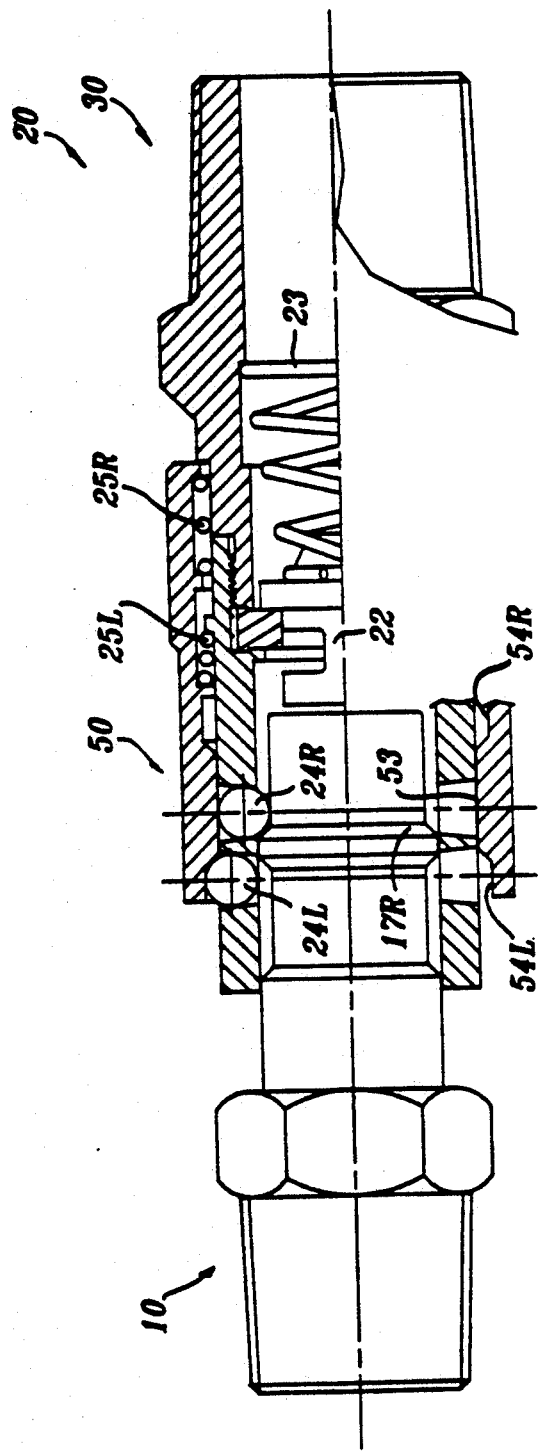
FIGS. 3 through 7 are views similar to FIG. 2 showing the sequential stages for movement of the members of the assembly from uncoupled to fully coupled position.

FIG. 3 shows the next stage for connecting the male and female members 10 and 20 and wherein the sleeve 50 is pushed right thereby compressing spring 25L and sliding spring 25R to the right without changing the compression of spring 25R. Balls 24R continue to be constrained in the locked position by action of ball locking surface 53. Balls 25L are no longer so constrained and are free to move radially outward toward left ball recess 54L. The progress of male member 10 through female member 20 toward valve plug 22 is blocked by action of balls 24R bearing against right rib bevel 17R on the male member 10. In this position the coupler assembly is not locked together and the valve 26 is closed.

Figure 4:
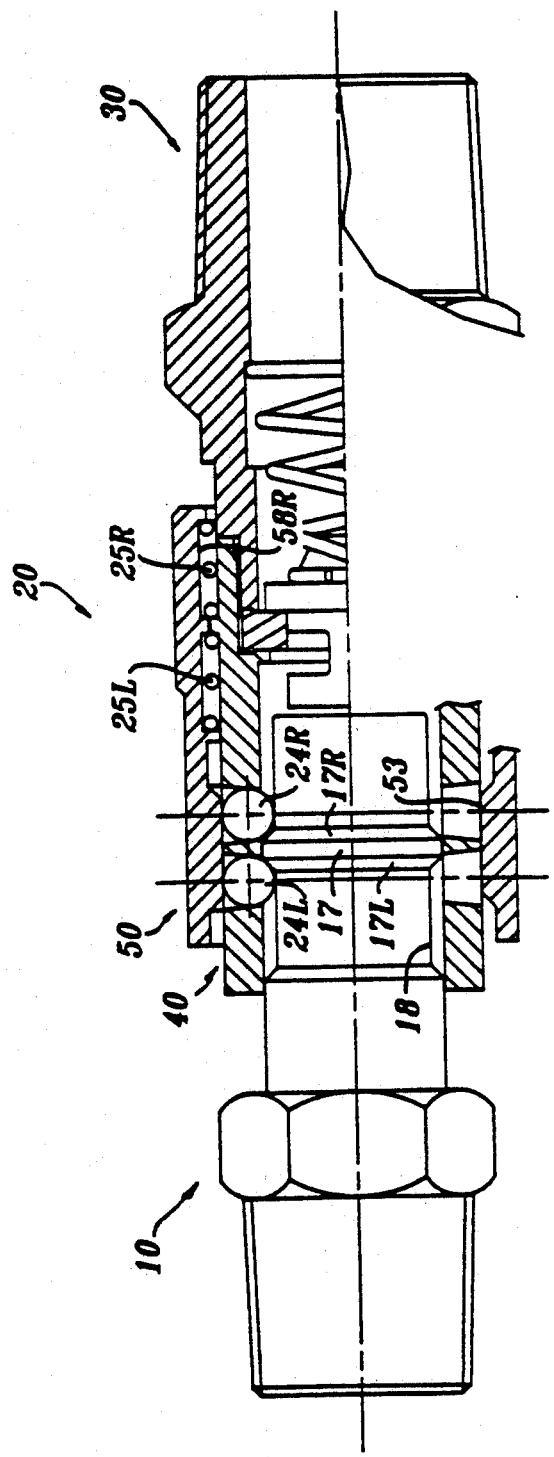

In the next stage of assembly, as shown in FIG. 4, sleeve 50 is released and returns to its neutral position by the force of sleeve spring 25L. Ball locking surface 53 bears on both balls 24R and 24L thereby locking them in place. The axial movement of the male member 10 is constrained by entrapment of the annual rib 17 between balls 24R and 24L substantially bearing on rib bevels 17R and 17L, respectively. At this stage, the valve 26 is closed but the coupler male and female 10 and 20 are locked together.

Figure 5:
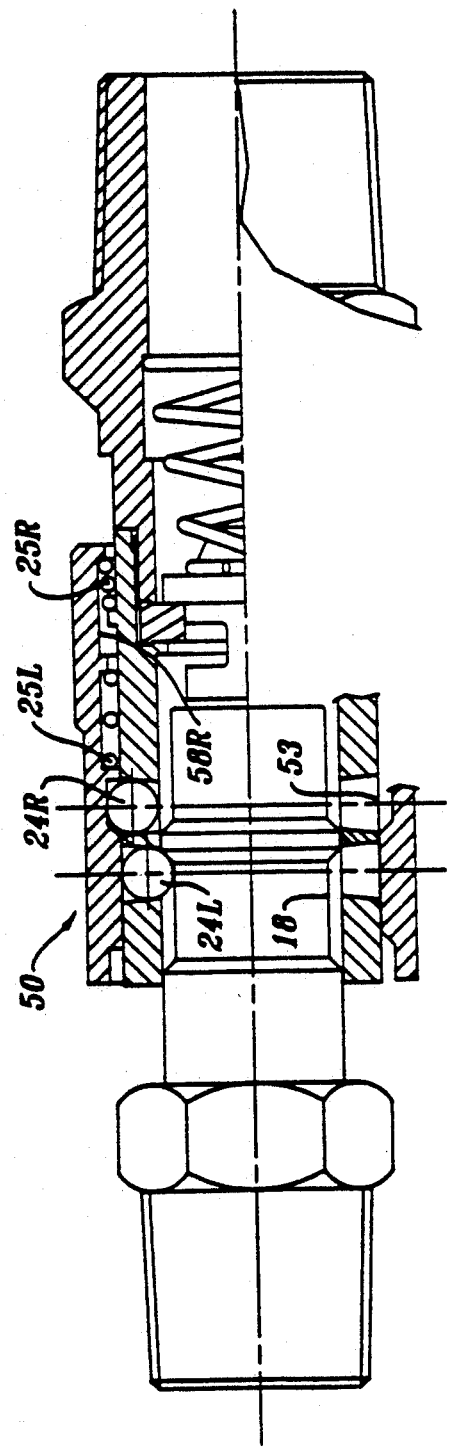
Figure 6:
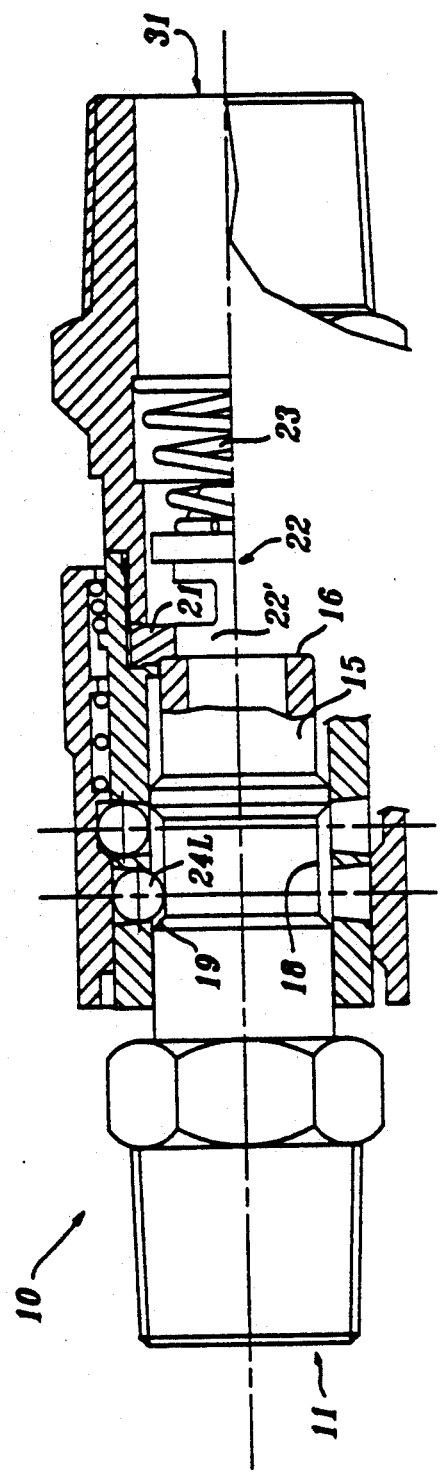

The next stages of operation are shown in FIGS. 5 and 6. From the position shown in FIG. 4, sleeve 50 is pushed left thereby compressing spring 25R and sliding spring 25L to the left without changing its compression. Balls 24L continue to be constrained in the locked position by the action of ball locking surface 53 against balls 24L. Right hand balls 24R are no longer so constrained and are free to move radially outward toward the right ball recess 54R. In this position, the male member 10 is free to move along the width of the circumferential grove 18. Such rightward movement is constrained by the action of seal 21 on lip 16 and further constrained by the action of ball 24L on the bevel 19 as shown in FIG. 6. Such leftward movement is constrained by the action of ball 24L on bevel 17L as in FIG. 4.

In the rightmost position shown in FIG. 6, the front radial lip 16 of the cylindrical nose portion 15 of the male member 10 bears against the reduced diameter portion 22' of the valve plug 22, urging the valve plug 22 right by compressing the valve spring 23 and finally seating on left radial surface of the seal 21. At this stage the valve 26 is open and fluid is thereby free to flow through the female bore 31 and male bore 11.

Next the sleeve 50 is allowed to snap back to its neutral position as shown in FIG. 7. In this position, sleeve 50 and sleeve springs 25R and 25L are in the neutral position, the coupler male and female members 10 and 20 are locked together and the valve 26 is open.

The presently disclosed coupling device is simple and safe to use. Whenever the valve 26 is open and thus fluid can flow the male 10 and female 20 members are locked together. There is no way to confuse the operating sequence and disarm the safety aspects of the present invention. The operating instructions to connect the male 10 and female 20 members essentially follow FIGS. 2-7. Push sleeve 50 right and insert the male 10 until this progress is stopped by the balls 24R resting against the bevel 17R as shown in FIG. 3. Release the sleeve 50 and allow it to snap back to the neutral position shown in FIG. 4. Next push the sleeve 50 left and push male member 10 right until seated against the seal 21. Release the sleeve 50 and let it snap back to neutral position. The coupling assembly is then connected and locked with the valve 26 and fluid passageways 31 and 11 open.

To disconnect, the order of FIGS. 2-7 is reversed, and during this sequence the male member 10 is prevented from flying away from the female member 20. The process includes the first step of pushing the sleeve 50 to the left, as shown in FIG. 6, which allows the male member 10 to snap back to the position shown in FIG. 5. Next, the sleeve 50 is allowed to snap back to neutral position as shown in FIG. 4. In the latter position, the pressurized fluid in the male member 10 and the downstream portion of the line can safely bleed out while the male 10 and female 20 members are prevented from flying apart by engagement of the annular rib 17 between the rows of ball members 24L and 24R. Finally, the sleeve 50 is pushed to the right as shown in FIG. 3 and the male member 10 is removed by pulling it left from the female member 20 to the position shown in FIG. 2.

It will be appreciated by those skilled in the art that certain modifications can be made in the structure of the embodiment shown and described without departing the scope of the present invention. While the prior art cited herein pertains to pneumatic systems, the preferred embodiment described herein may be adapted for any compressible or non-compressible fluid. A suitable embodiment of the present invention for a particular use case, may, therefore, require a change in proportion, dimension and/or material of the components of the preferred embodiment described herein.

Figure 8:
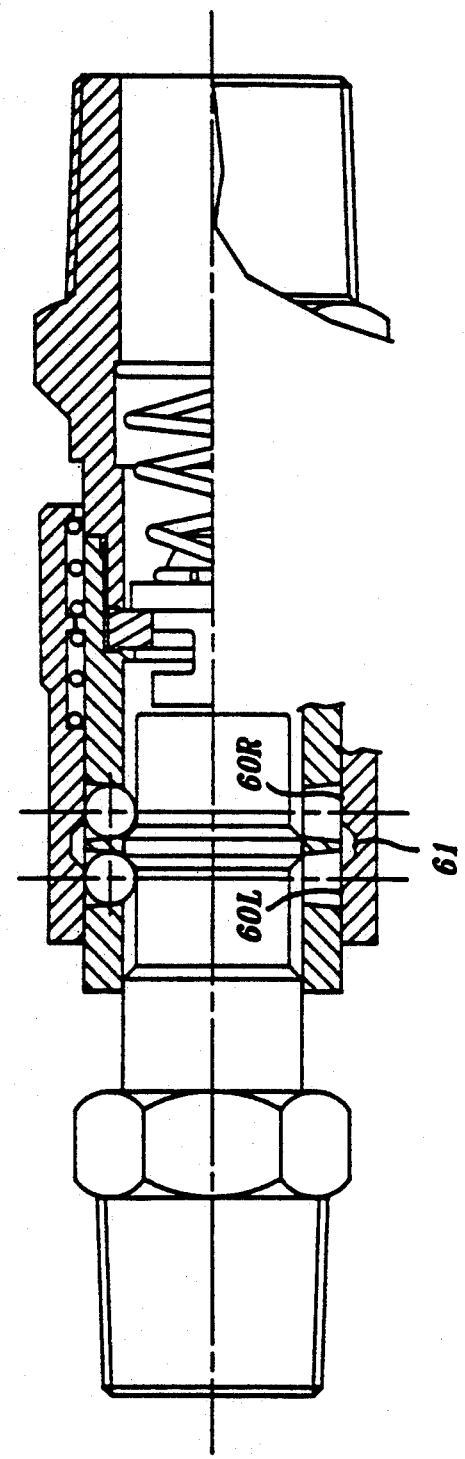
FIG. 8 is an elevational partial sectional view through the male and female members of an alternative embodiment which depicts the functional equivalent of the embodiment of FIG. 4.
Figure 9:
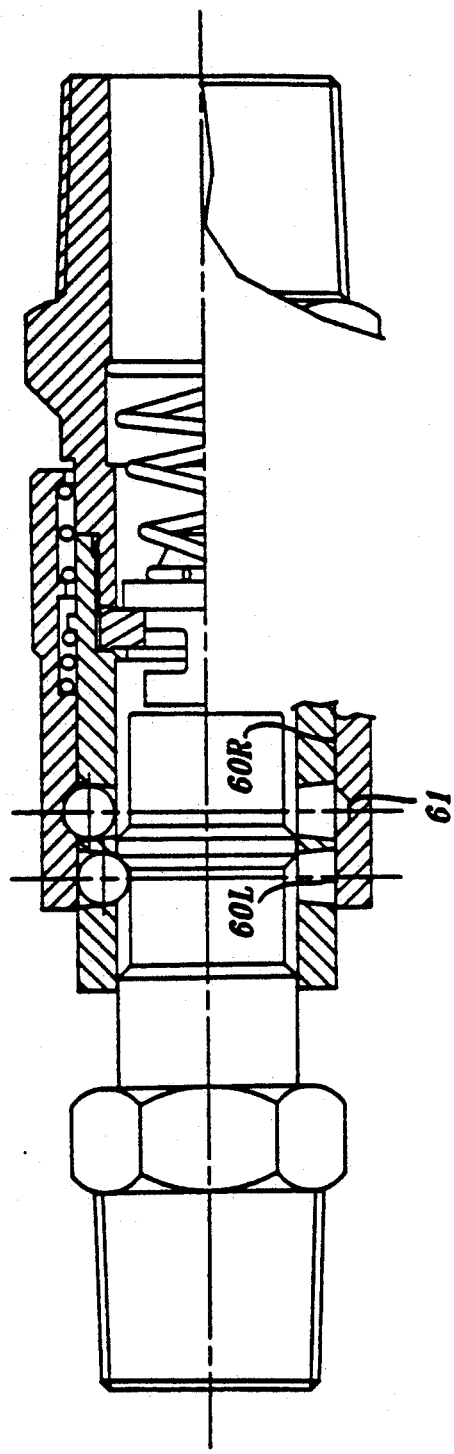
FIG. 9 is a view similar to that of FIG. 8 which depicts the functional equivalent of FIG. 5.
Figure 10:
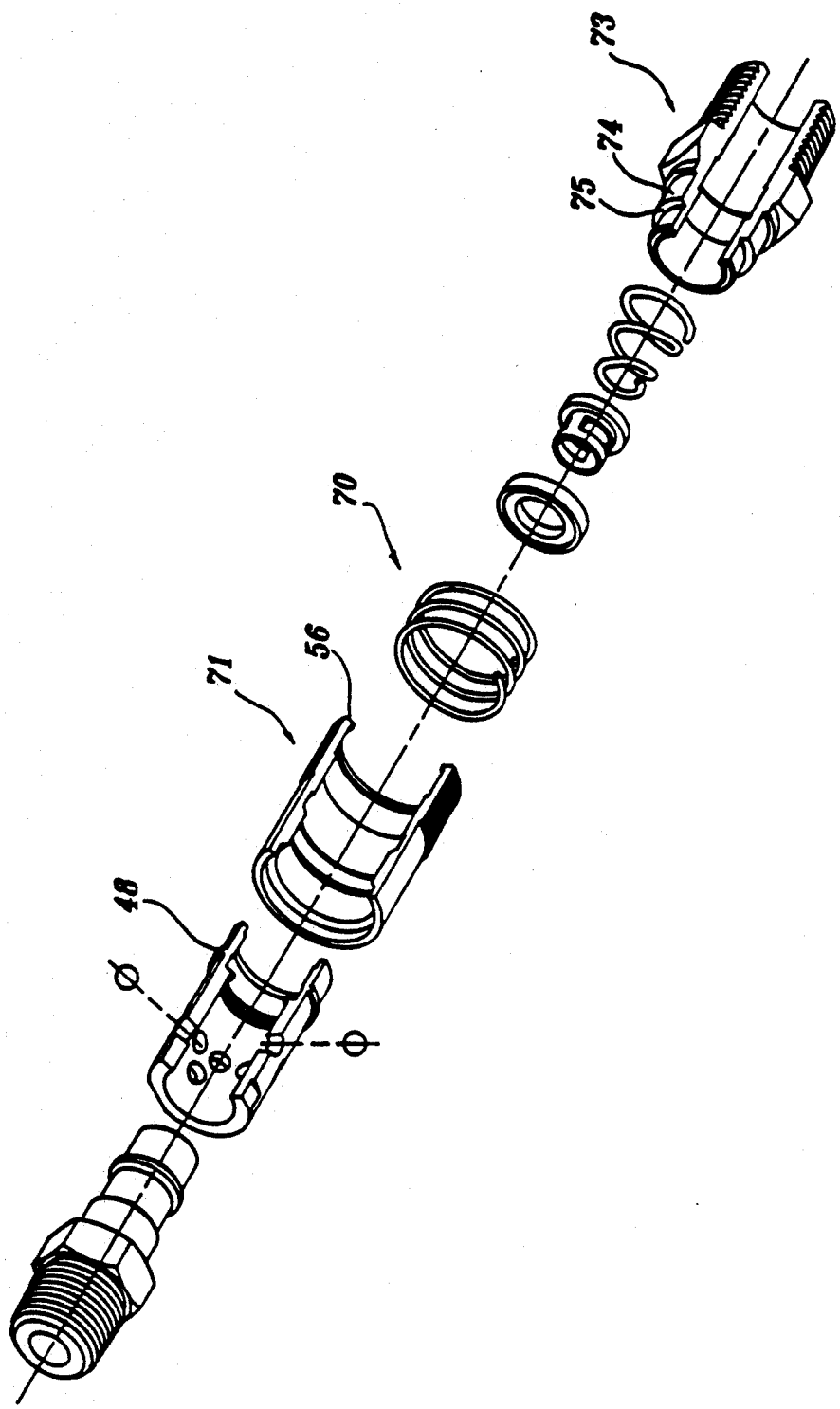
FIG. 10 is an exploded view of the preferred embodiment.

By way of example, such an alternative to the previously disclosed embodiment is partially shown in FIGS. 8 and 9. In the previously disclosed embodiment, there are two ball recess surfaces 54L and 54R, one on each side of ball locking surface 53. In this alternative embodiment, there are two ball locking surfaces 60L and 60R, one on each side of ball recess surface 61. In either embodiment, both balls 24 are locked when sleeve 50 is in the neutral position. In the previously disclosed embodiment, as sleeve 50 is moved right, ball 24L is no longer locked. Whereas, in the alternative embodiment, as sleeve 50 is moved right, ball 24R is no longer locked. Thus leftward movement in one embodiment is functionally equivalent to rightward movement in the other embodiment.

DESCRIPTION OF THE PREFERRED EMBODIMENT

By way of another example, the preferred embodiment as an alternative to the previously disclosed embodiments is particularly shown in FIGS. 10-13. In the previously disclosed embodiments, sleeve 50 is axially slidable from its neutral position via two springs, the left sleeve spring 25L and the right sleeve spring 25R. In the preferred embodiment now described, springs 25L and 25R have been replaced by a single spring 70. Correspondingly, sleeve 50 and valve housing 30 have been modified as described below.

Figure 11:
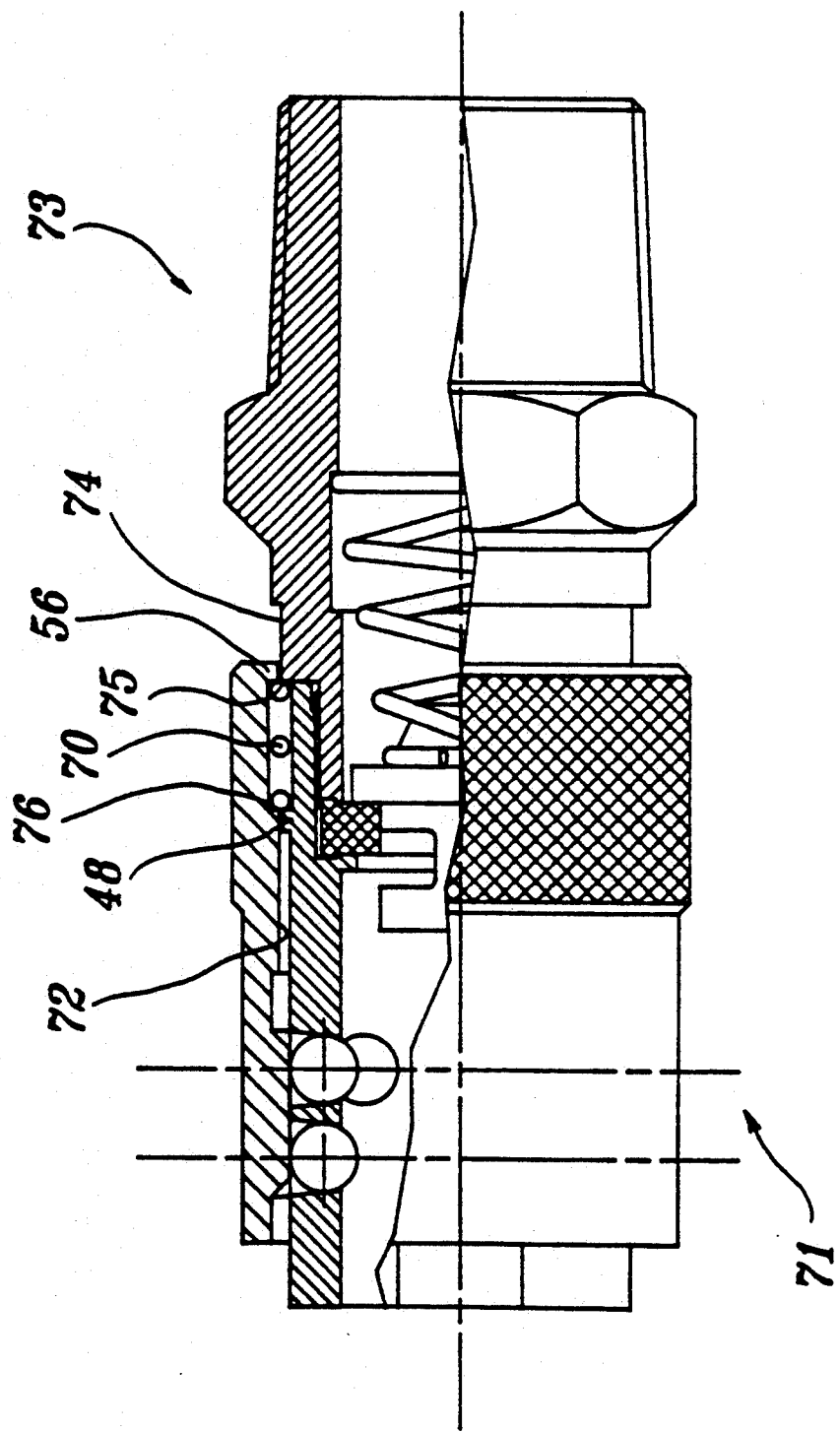
FIG. 11 is an elevational partial sectional view of the female member of the preferred embodiment in the neutral position.
Figure 12:
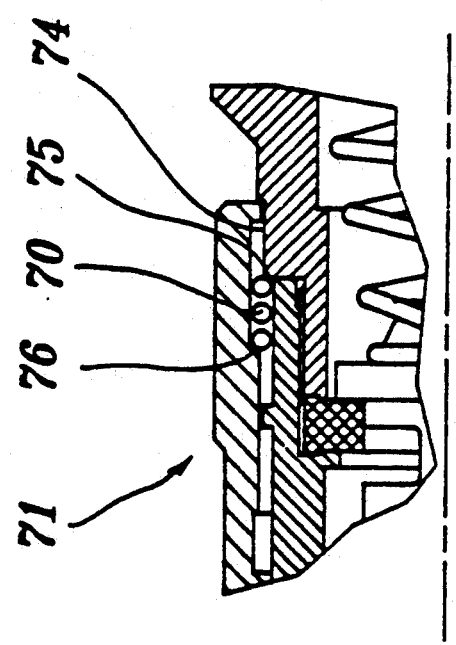
FIG. 12 is a sectional detail view of the preferred embodiment particularly depicting the sleeve in the rightward position.
Figure 13:
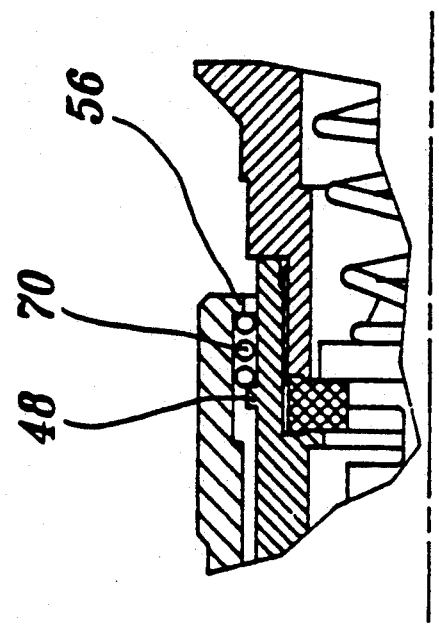
FIG. 13 is a sectional detail view of the preferred embodiment particularly depicting the sleeve in the leftward position.

Referring now particularly to FIGS. 11-13, it will be noted that sleeve 71 of the preferred embodiment is substantially the sleeve 50 of the previously disclosed embodiments except modified such that left spring stop 56L and reduced diameter portion 58L are replaced by a single surface 72 having a diameter substantially of but no less than that of stop 55 of the previously disclosed embodiments. It will be further noted that in the preferred embodiment, stop 56 has substantially the diameter of surface 72.

Valve housing 73 of the preferred embodiment is substantially the valve housing 30 of the previously disclosed embodiments except modified to include surface 74 which has diameter substantially that of stop 48 and length sufficient to accommodate the movement of sleeve 71 during the normal operation of the present invention.

As particularly shown in FIG. 11, sleeve 71 is biased toward the neutral position by action of spring 70 on stop 48 and right face 76 of surface 72 to the left, and on stop 56 and left fact 75 of the surface 74 to the right. As particularly shown in FIG. 12, during rightward displacement of sleeve 71, spring 70 bears on face 76 on the left and face 75 on the right, thus urging sleeve 71 leftward toward the neutral position. As particularly shown in FIG. 13, during leftward displacement of sleeve 71, spring 70 bears on stop 48 on the left and stop 56 on the right, thus urging sleeve 71 rightward toward the neutral position.

It can be seen the alternative sleeve configuration and operations sequence of the alternative embodiment particularly shown in FIGS. 8 and 9 can be applied to the preferred embodiment.

The terms and expressions which have been employed here are used as terms of description and not of limitation, and there is no intention, in the use of such terms and expressions, of excluding equivalence of the features shown and described, or portions thereof from the scope of the present invention.

We claim:

1. A method of assembling a coupling assembly comprised of a male member and a female member including a normally closed valve and a locking member comprising the steps:
   moving said locking member in one direction from a neutral position,
   moving said male and female members together to a first locking position,
   returning said locking member to the neutral position thereby locking said male and female members together with said valve closed,
   moving said locking member from said neutral position in a direction opposite said one direction,
   moving said male and female members further together to a second locking position and to pen said valve and
   returning said locking member to the neutral position thereby locking said male and female members together with said valve open.

2. The method of claim 1 wherein said step of moving said locking member in one direction includes manually moving said locking member in said one direction and wherein said step of moving said locking member in a direction opposite said one direction includes manually moving said locking member in a direction opposite said one direction.

3. The method of claim 2 wherein said male and female members have bores therethrough which are axially aligned during the method of assembling the coupling assembly and wherein steps of moving said locking member in one direction from a neutral position and in a direction opposite said one direction include moving said locking member parallel to the axis of the bore through said male and female members.

4. In a safety hose coupler assembly including a hollow male member having an insertion surface on one end with an annular rib on the insertion surface, a hollow female member having a bore therethrough for receiving said male member insertion surface and having a valve mounted within said bore, which valve is movable to open position upon complete insertion of said male member insertion surface into said female member, and locking means for locking said male and female members together in fully coupled position with the seal open, the improvement comprising:
   at least a pair of locking means located on said female member for passing said annular rib therepast and for locking said annular rib in positions wherein said male and female members are either uncoupled with the valve closed or coupled against longitudinal movement with the valve closed or coupled against longitudinal movement with the valve open and
   locking actuation means movable in one direction from a neutral position in which both of said locking means are in locking position to a position wherein only one of said locking means is in locking position and movable from said neutral position in a direction opposite to said one direction wherein only the other of said locking means is in locking position.

5. The coupler of claim 4 wherein each of said locking means includes a plurality of balls.

6. The coupled of claim 4 wherein said locking actuation means includes a sleeve slidable longitudinally of said female member and spring biased to said neutral position.

7. The coupler of claim 6 wherein said female member includes a first radially outwardly projecting spring stop and said locking sleeve includes a first radially inwardly projecting spring stop and wherein said outwardly projecting and inwardly projecting spring stops are substantially aligned when said locking sleeve is in said neutral position.

8. The coupler of claim 7 wherein said female member has a second radially outwardly projecting spring stop and said locking sleeve includes a second radially inwardly projecting spring stop.

9. In the coupler assembly of claim 4 means for spring biasing said actuation means to said neutral position.

10. In the coupler assembly of claim 4 each of said locking means including a plurality of balls movable in tapered holes in said female member between a locking position wherein said balls project into said female bore and engage said male member insertion surface to prevent movement of said rib surface therepast and an unlocking position wherein said balls are substantially withdrawn from said female bore and permit movement of said annular rib therepast.

11. In the coupler assembly of claim 10 said locking actuation means including a locking sleeve slidably mounted on said female member and having an inwardly projecting ball locking surface with a longitudinal length at least substantially equal to the distance between the centers of the balls of the different locking means.

12. The coupler of claim 11 wherein said female member includes a first radially outwardly projecting spring stop and said locking sleeve includes a first radially inwardly projecting spring stop and wherein said outwardly projecting and inwardly projecting spring stops are substantially aligned when said locking sleeve is in said neutral position.

13. The coupler of claim 12 wherein said female member has a second radially outwardly projecting spring stop and said locking sleeve includes a second radially inwardly projecting spring stop.

14. In the coupler of claim 4 said locking means spaced apart longitudinally on said female member for capturing said annular rib therebetween in locking position in said coupled position of said members with said valve and holding said members in said coupled position with said valve closed upon complete insertion of said male member insertion surface in said female member.

15. A safety hose coupler comprising:
a hollow male member having an insertion surface with an annular rib;
a hollow female member for receiving said male member insertion surface and having a valve therein, which valve is movable to open position upon complete insertion of said male member insertion surface into said female member;
at least a pair of locking means located on said female member for passing said annular rib and for locking said annular rib in positions wherein said male and female members are either uncoupled or coupled against longitudinal movement with the valve closed or coupled against longitudinal movement with the valve open, each of said locking means movable between locking and unlocking positions which respectively prevent or permit movement of said annular rib therepast;
said locking means capturing said annular rib therebetween in locking position in said coupled position of said members with the valve closed, and holding said members coupled in locking position upon complete insertion of said male member insertion surface; and
locking actuation means movable in one direction from a neutral position in which both of said locking means are in locking position to a position wherein only one of said locking means is in locking position and movable from said neutral position in a direction opposite said one direction wherein only the other of said locking means is in locking position.

16. The coupler of claim 15 wherein each of said locking means includes a plurality of balls.

17. The coupler of claim 15 wherein said locking actuation means includes a sleeve slidable longitudinally of said female member and spring biased to said neutral position.

18. The coupler of claim 17 wherein said female member includes a first radially outwardly projecting spring stop and said locking sleeve includes a first radially inwardly projecting spring stop and wherein said outwardly projecting and inwardly projecting spring stops are substantially aligned when said locking sleeve is in said neutral position.

19. The coupler of claim 18 wherein said female member has a second radially outwardly projecting spring stop and said locking sleeve includes a second radially inwardly projecting spring stop.

20. A safety hose coupler comprising:
a hollow male member having a bore therethrough and having on one end an external insertion surface having an annular rib;
a hollow female member having a bore therethrough for receiving said male member insertion surface and having a valve mounted within said bore, which valve is movable to open position upon complete insertion of said male member insertion surface into said female member;
at least a pair of longitudinally spaced apart locking means located on said female member for passing said annular rib and for locking said annular rib in positions wherein said male and female members are either uncoupled with the valve closed or coupled against longitudinal movement with the valve closed or coupled against longitudinal movement with the valve open;
each of said locking means including a plurality of balls movable in tapered holes in said female member between a locking position wherein said balls project into said female bore and engage said male member insertion surface and prevent movement of said rib surface therepast and an unlocking position wherein said balls are substantially withdrawn from said female bore and permit movement of said annular rib therepast, said locking means capturing said annular rib therebetween in locking position in said coupled position of said members with said valve closed and holding said members coupled in locking position with said valve open upon complete insertion of said male member insertion surface; and
a locking sleeve slidably mounted on said female member and movable in one direction from a neutral position in which both of said locking means are in locking position to a position wherein only one of said locking means is in locking position and movable from said neutral position in a direction opposite said one direction wherein only the other of said locking means is in locking position.

21. The coupler of claim 20 including means for spring biasing said sleeve to neutral position from the position wherein only said one of said locking means is in locking position and from the position wherein only the other of said locking means is in locking position.

22. The coupler of claim 21 wherein said female member includes a first radially outwardly projecting spring stop and said locking sleeve includes a first radially inwardly projecting spring stop and wherein said outwardly projecting and inwardly projecting spring stops are substantially aligned when said locking sleeve is in said neutral position.

23. The coupler of claim 22 wherein said female member has a second radially outwardly projecting spring stop and said locking sleeve includes a second radially inwardly projecting spring stop.

* * * * *